United States Patent
Liang et al.

(10) Patent No.: US 7,986,962 B2
(45) Date of Patent: *Jul. 26, 2011

(54) PROVIDING A HIGH-SPEED CONNECTION BETWEEN A MEMORY MEDIUM OF A MOBILE DEVICE AND AN EXTERNAL DEVICE

(75) Inventors: Wayne Liang, Nesconset, NY (US);
Henry Wurzburg, Austin, TX (US);
Morgan H. Monks, Tempe, AZ (US)

(73) Assignee: Standard Microsystems Corporation, Hauppauge, NY (US)

( * ) Notice: Subject to any disclaimer, the term of this patent is extended or adjusted under 35 U.S.C. 154(b) by 921 days.

This patent is subject to a terminal disclaimer.

(21) Appl. No.: 11/941,115

(22) Filed: Nov. 16, 2007

(65) Prior Publication Data
US 2009/0131036 A1    May 21, 2009

(51) Int. Cl.
*H04W 88/02* (2009.01)
(52) U.S. Cl. .................................... 455/550.1
(58) Field of Classification Search ............... 455/456.1, 455/422.1, 456.5, 550.1; 343/329, 729; 235/462.45; 439/66; 381/94.1; 370/312
See application file for complete search history.

(56) References Cited

U.S. PATENT DOCUMENTS

| 7,051,169 | B2 | 5/2006 | Ganton |
| 7,197,583 | B2 | 3/2007 | Takinosawa et al. |
| 7,343,439 | B2 | 3/2008 | Mills |
| 7,346,368 | B2 | 3/2008 | Llanos et al. |
| 7,480,753 | B2 * | 1/2009 | Bohm et al. ............ 710/104 |
| 2006/0053244 | A1 * | 3/2006 | Fruhauf et al. ........... 710/313 |
| 2006/0056401 | A1 | 3/2006 | Bohm et al. |
| 2008/0042616 | A1 * | 2/2008 | Monks et al. ............ 320/106 |

OTHER PUBLICATIONS

"New Cypress West Bridge™ Controller Delivers the Market's Fastest Sideloading for PMPs, PNDs, Wireless Cards, and Other Embedded Applications", Business Wire, Dec. 10, 2007, retrieved from Internet on Apr. 30, 2008: http://findarticles.com/p/articles/mi_m0EIN/is_2007_Dec_10/ai_n21149014, 2 pages.

"Cypress Develops Peripheral Controller for Multimedia Mobile Handsets", EDA Geek, Nov. 27, 2006, retrieved from Internet Apr. 30, 2008: http://edageek.com/2006/11/27/cypress-peripheral-controller-handsets/, 2 pages.

Lapedus, "Cypress Semi forges new mobile device model", EE Times, Nov. 30, 2006, retrieved from Internet Apr. 30, 2008: http://www.eetimes.com/news/semi/showArticle.jhtml?articleID=196600460, 4 pages.

* cited by examiner

*Primary Examiner* — Diane Mizrahi
(74) *Attorney, Agent, or Firm* — Meyertons Hood Kivlin Kowert & Goetzel, P.C.; Jeffrey C. Hood; Joel L. Stevens

(57) ABSTRACT

System and method for providing a high speed connection to a memory medium of a mobile device. The mobile device may be a mobile phone or other type of portable electronic device. The memory medium may be removable and/or may be flash memory, as desired. The mobile device may include a USB hub that provides a direct high speed connection between an external device and a memory medium of the mobile device. The USB hub may also provide a connection (possibly high speed) between the external device and the processor of the mobile device. The mobile device may also include a high speed connection between the processor of the mobile device and the memory medium.

12 Claims, 4 Drawing Sheets

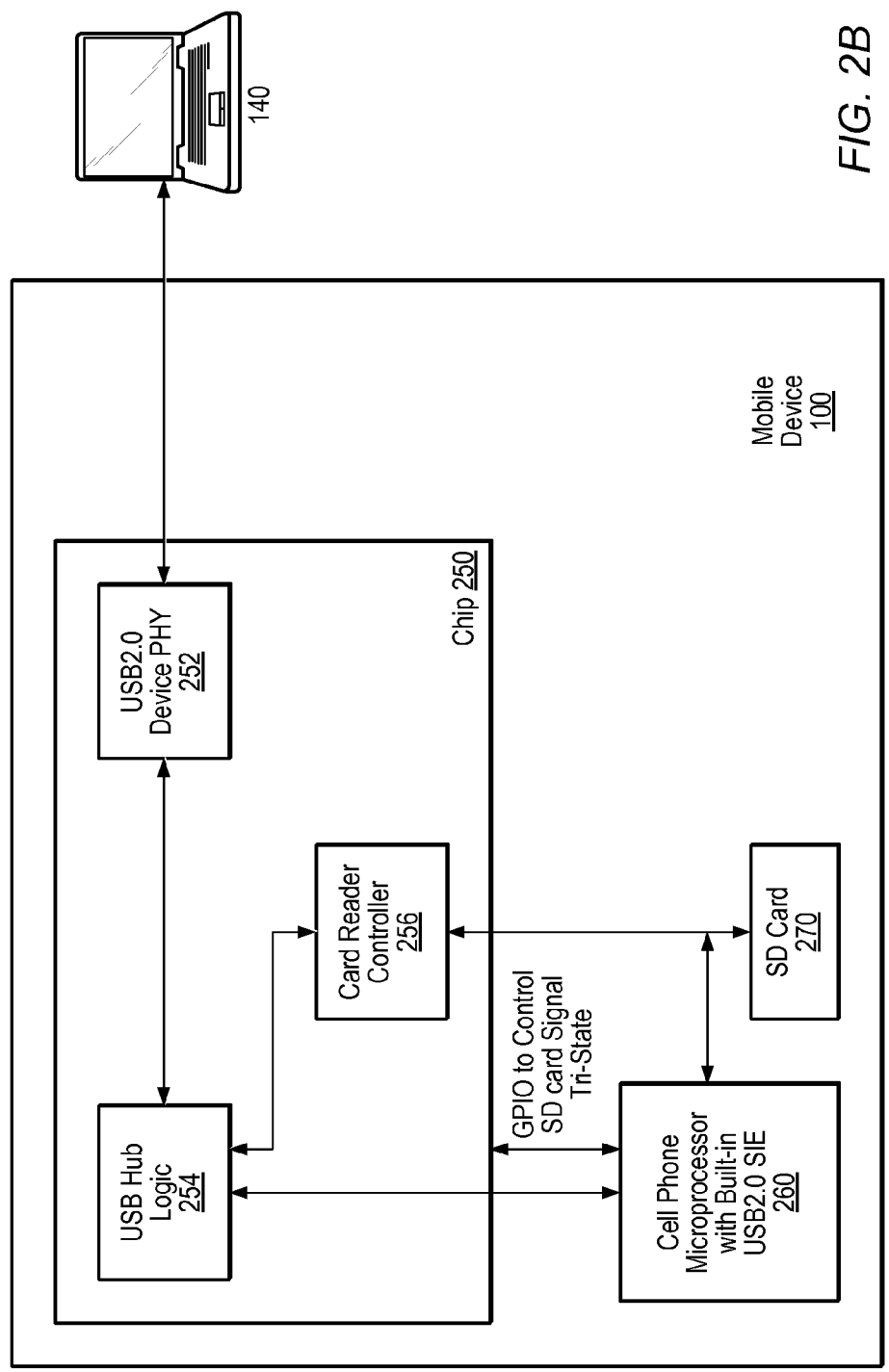

PROVIDING A HIGH-SPEED CONNECTION BETWEEN A MEMORY MEDIUM OF A MOBILE DEVICE AND AN EXTERNAL DEVICE

FIELD OF THE INVENTION

The present invention relates to the field of mobile devices, and more particularly to a system and method for providing high speed communication between an external device and a mobile device.

DESCRIPTION OF THE RELATED ART

In recent years, there has been a proliferation of mobile devices. For example, many people own or purchase various portable devices such as cell phones, music players, video players, and cameras, among other devices. Many of these mobile devices include memory medium(s) for storing information. The memory medium(s) may be internal, external/removable (e.g., non-volatile memory cards such as SD cards). The memory medium(s) may be accessible by a processor of the mobile device or by an external device. However, accessing the memory medium (e.g., by the processor and/or internal memory medium) has not been generally available at high speed due to current design implementations in mobile devices. Correspondingly, improvements in mobile device design are desirable.

SUMMARY OF THE INVENTION

Various embodiments are presented of a system and method for providing high speed communication between an external device and a mobile device. The mobile device may be any of a variety of mobile devices (e.g., including cell phones, personal digital assistants (PDAs), mobile computers, etc.), as desired.

In some embodiments, the system (e.g., a chip inside of the mobile device) may include a first port for coupling to the external device. The first port may include a universal serial bus (USB) port. The system may further include a second port for coupling to a memory medium of the mobile device. The memory medium may be a removable memory medium (e.g., flash cards such as a secure digital (SD) card, among others) or may be a built in memory, as desired. The system may also include a third port for coupling to a processor of the mobile device. In some embodiments, the third port may be operable to use a first set of registers of a UTMI (USB Transceiver Macrocell Interface) low pin interface (ULPI) to communicate with the external device and may use a second set of registers of the ULPI to communicate with the memory medium.

Additionally, the system may include a USB hub coupled to the first port. The USB hub may be operable to provide a connection, e.g., a high speed USB connection, between the first port and the second port during transfer of data between the external device and the memory medium. Note that the processor of the mobile device may not required for transfer of data between the external device and the memory medium, thereby allowing for greater processor bandwidth for other activities (e.g., cell phone activities, or other mobile device activities). The USB hub may also provide a high speed connection between the first port and the third port (e.g., for high speed communication between the external device and the processor of the mobile device).

BRIEF DESCRIPTION OF THE DRAWINGS

A better understanding of the present invention can be obtained when the following detailed description of the preferred embodiment is considered in conjunction with the following drawings, in which:

FIGS. 2A and 2B are exemplary block diagrams of a mobile device, according to one embodiment.

Figure 1:
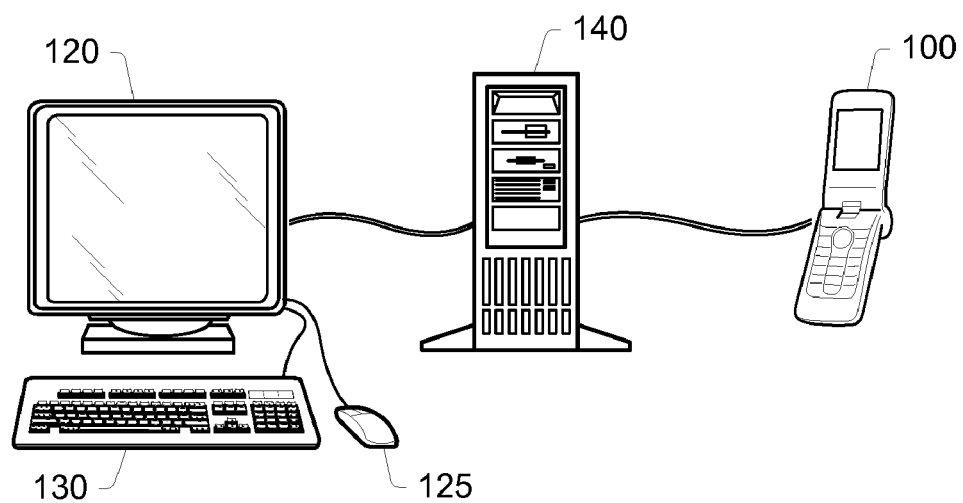
FIG. 1 illustrates an exemplary system suitable for implementing various embodiments of the invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a Flash, magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network and/or other physical transmission medium, that conveys signals such as electrical, electromagnetic, or digital signals.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device—any of various types of portable computing devices, including cell or mobile phones (including smart phones), PDAs, digital cameras, portable media players, etc. In general, the term "mobile device" can be defined to encompass devices (or combinations thereof) which include at least one processor that executes instructions from a memory medium and is easily portable (e.g., handheld) by a user.

FIG. 1—Exemplary Systems

FIG. 1 illustrates one embodiment of an exemplary system operable to allow for high speed connection between an external device and a memory medium of a portable device. As shown, the mobile device 100 may be coupled to external device 140 (possibly via a hub).

The mobile device 100 may be any of numerous devices. For example, the mobile device 100 may be a cell or mobile phone (e.g., a flip phone with an LCD display, a single screen phone, such as a Blackberry™ or iPhone™, among others), a personal media player (e.g., an mp3 player, and/or an IPOD™, among other players, a CD player, a digital video player, a DVD player, etc.), a digital camera, or any other mobile device. In some embodiments, the mobile device 100 may be a universal serial bus (USB) device. Additionally, the mobile device may be coupled to the external device 140 via a hub, possibly a USB hub, as desired. Additionally, as described herein, the mobile device may include a processor and one or more memory mediums. The memory medium(s) may be accessible by the processor of the mobile device 100 and/or the external device 140, among others. Further descriptions regarding embodiments of elements of the mobile device are found below in descriptions regarding FIGS. 2A and 2B. Thus, the mobile device 100 may be any of a variety of appropriate devices.

Additionally, the external device 140 may be any of various external devices; more specifically, the external device 140 may be a computer system (e.g., as shown, with input devices 125 and 130 and display 120) and/or other types of external devices, e.g., ones that access a memory medium of the mobile device 100. Alternatively, or additionally, the external device 140 may be a second USB device, e.g., similar to the mobile device 100, among others. For example, in one embodiment, the second mobile device may be a USB on-the-go (OTG) device which may be operable to act as a host and a device, e.g., depending on the situation. Thus, according to various embodiments the external device 140 may be any of various appropriate devices.

Additionally, the external device 140 may include at least one memory medium on which one or more computer programs or software components may be stored. For example, the memory medium may store operating system software, as well as other software for operation of the external device 140. Various embodiments further include receiving or storing instructions and/or data implemented in accordance with the foregoing description upon a carrier medium. Note that the above descriptions of the external device 140 and the mobile device 100 are exemplary only and other components and systems are envisioned. Thus, FIG. 1 illustrates an exemplary system according to some embodiments.

Figure 2A:
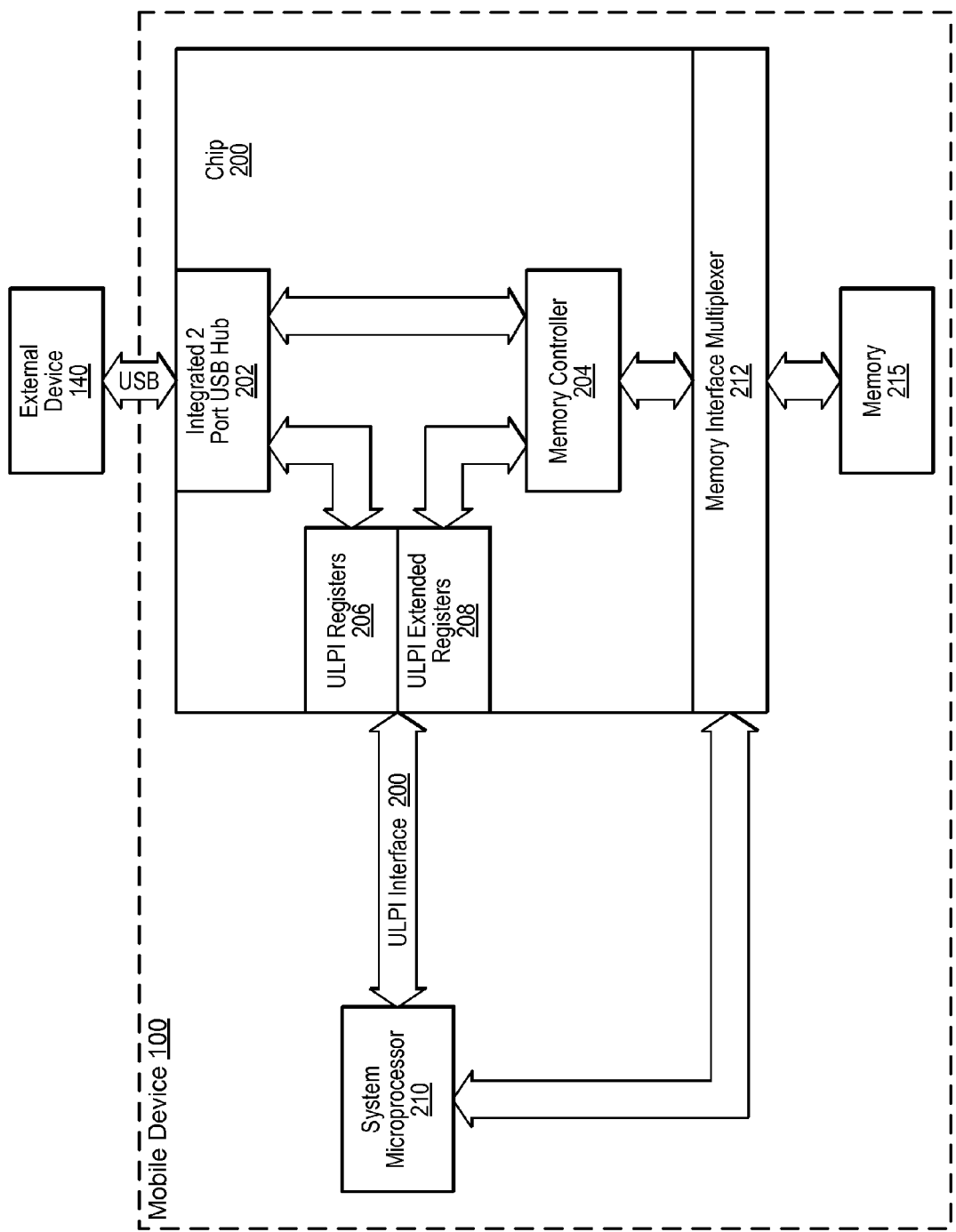

FIGS. 2A and 2B—Exemplary Block Diagrams of a Mobile Device

FIGS. 2A and 2B are exemplary block diagrams of the block diagram 100.

As shown in FIG. 2A, the mobile device 100 may include an internal high speed multiple port (in this case, a two port) USB hub 202 which may be usable to connect to the external device 140 (e.g., via USB, as shown). The USB hub 202 may also be connected to the memory controller 204 (for transmission and reception of data to/from the memory 215), to the system microprocessor 210 via ULPI (UTMI (USB Transceiver Macrocell Interface) low pin interface) registers 206, and to other internal devices via USB or ULPI.

The system microprocessor 210 (sometimes referred to as a baseband processor) may also be connected to the integrated memory controller 204 via ULPI extended registers 208. Thus, the processor may use a first set of registers of a ULPI to communicate with the external device 140 and a second set (extended set) of registers of the ULPI to communicate with the memory medium 215. Note that the registers 208 (and 206 for transfer between the processor and the external device 140) may be used initially to set up a connection (e.g., to initiate a transfer of 500 bytes from a specific memory location, for example) or may be used via a polling mechanism, where specific information is requested and received on specific pins of the ULPI. Thus, to transfer information between the processor 210 and the memory medium 215, extended registers 208 may be used to initiate the transfer and/or may be used during the transfer. Thus, the extended registers 208 may be used (in both situations) for transferring data between the processor and the memory medium 215. By using the ULPI, the transfer of data of the processor 210 may be performed at a USB high speed transfer rate; however, in some embodiments, using the extended registers 208 of the ULPI, may limit the transfer speed between the processor 210 and the memory medium 215.

As shown, the USB hub 202, the memory controller 204, and the ULPI registers 206 and 208 (and possibly the memory interface multiplexer 212) may all be included on a single chip or system 200.

The memory 215 may be any type of memory medium, as desired. For example, the memory 215 may be non-volatile memory such as flash and/or may be a removable memory medium. In one embodiment, the memory 215 may be a memory card, e.g., an SD (secure digital) card, or a high speed SIM (subscriber identity module) card which stores information (among other types of memory cards such as a memory stick, compactflash, etc.). Thus, the memory 215 may be any type of memory medium, as desired.

In some embodiments, the system microprocessor 210 may communicate with the memory 215 via the ULPI extended registers 208 and integrated memory controller 204 and/or the memory interface multiplexer 212. However, in some embodiments, the system microprocessor 210 may only use the memory interface multiplexer 212 when the ULPI interface cannot be used (e.g., when the system microprocessor does not support the ULPI interface). In these embodiments, the system microprocessor 210 may communicate with the memory 215 at a lower rate than allowed by the ULPI interface. Note that, as shown, the memory interface multiplexer 212 may be optional, and may only be provided for backwards compatibility, as desired. Thus, when present, the memory interface multiplexer 212 may handle requests from the system microprocessor 210 and the memory controller 204.

An alternative block diagram of the mobile device 100 is shown in FIG. 2B, according to one embodiment. As shown, chip 250 may include a USB 2.0 device PHY 252 for coupling to external device 140, USB hub logic 254 (coupled to the PHY 252 e.g., using a ULPI), and a card reader controller 256. Additionally, the USB hub 254 may be coupled to the cell phone microprocessor with built-in USB 2.0 SIE (serial interface engine) 260. The card reader controller 256 and the microprocessor 260 may be each coupled to SD card 270.

Thus, FIGS. 2A and 2B provide exemplary block diagrams for the mobile device 100, according to various embodiments.

FIG. 3—Flowchart

Figure 3:
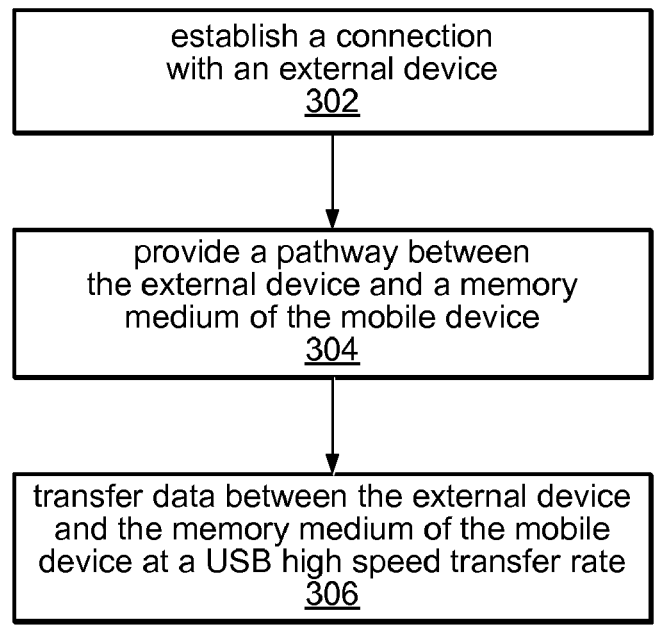
FIGS. 3 and 4 are flowchart diagrams illustrating embodiments of a method for providing high speed connection to a memory medium of a mobile device.

FIG. 3 illustrates a method for providing a high speed connection to a memory medium of a mobile device. The method shown in FIG. 3 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

In 302, a connection may be established a mobile device and an external device. In one embodiment, the connection may be established with a memory medium of the mobile device and the external device. The external device may be connected to the mobile device via a first port of the mobile device. The connection may be established by logic of a device or chip within the mobile device, such as those described above in FIGS. 2A and 2B.

For example, the hub logic of the chip may establish the connection with the mobile device. Note that the hub logic may be a 2 port USB hub as described above, but may be any type of hub as desired. For example, the hub may be a switching hub with more than 2 ports, e.g., one or more ports for external devices and a plurality of ports for components of the mobile device, as desired.

In various embodiments, the connection may be established according to various protocols. For example, in one embodiment, the connection may be established according to USB protocols, e.g., using an enumeration process. However, note that various on the go (OTG) protocols (e.g., as defined in the USB specification) may be used, as desired.

As indicated above, the external device may be any of a variety of devices (e.g., computers or other devices) and the mobile device may be any of a variety of portable devices (e.g., cell phones, portable media players, PDAs, etc.). Thus, a connection may be established between the mobile device and the external device.

In 304, a pathway may be provided between the memory medium of the mobile device and the external device. Note that the provided pathway may not include a processor of the mobile device. Correspondingly, transfer of data may not be limited by the processor, nor may transfer of data between the memory medium and the external device affect processing of the processor of the mobile device. The provided pathway may include the USB hub of the mobile device, a memory controller of the mobile device, and possibly a memory interface multiplexer, among other possibilities. Exemplary pathways are illustrated in FIGS. 2A and 2B above. However, note that the method is not limited to those pathways described herein or the block diagrams provided by FIGS. 2A and 2B.

In 306, data may be transferred between the external device and the memory medium of the mobile device, e.g., at a USB high speed transfer rate, using the provided pathway. The USB high transfer rate may be a USB 2.0 high transfer rate (e.g., 480 Mbps), or greater transfer rates, for example. However, USB high transfer rate may refer to speeds greater than the transfer rates offered by USB 1.1.

As noted above, the transfer of data may not include use of the processor of the mobile device. However, in some embodiments, the processor may be used for some limited activities, but may not affect the transfer rate, nor limit the bandwidth of the processor for normal mobile device activities. Accordingly, during transfer of data in 306, the processor may be operable to execute various other procedures (e.g., associated with the mobile device, such as making phone calls, playing back media, transferring data to other memories, etc.). Similarly, the local bus of the mobile device may not be affected by the transfer of data in 306. Accordingly, the direct pathway between the external device and the memory medium may allow the mobile device to operate as if the transfer of data is not occurring. Thus, the local bus (or bandwidth of the processor) of the mobile device may not be limited by the transfer of data because the pathway does not involve the local bus (or processor).

The data transferred in 306 may be any type of data, as desired. For example, a user may wish to put media (music, video, photographs, etc.), documents, contact information, and/or other information on the memory medium for access while away from a computer (or the external device). Thus, a user may quickly transfer information from an external device to the mobile device.

In some embodiments, as noted above, the method may further include transferring data between the processor and the external device, e.g., using a first set of ULPI registers, and/or transferring data between the processor and the memory medium, e.g., using a second set of ULPI registers (e.g., the extended ULPI registers). However, the processor may optionally transfer data to/from the memory medium using a memory interface without using the ULPI (e.g., when the processor does not support transfer of data through the ULPI). Where the memory is an SD card, the transfer of data may occur via an SD memory interface using an SD I/O port.

FIG. 4—Flowchart

Figure 4:
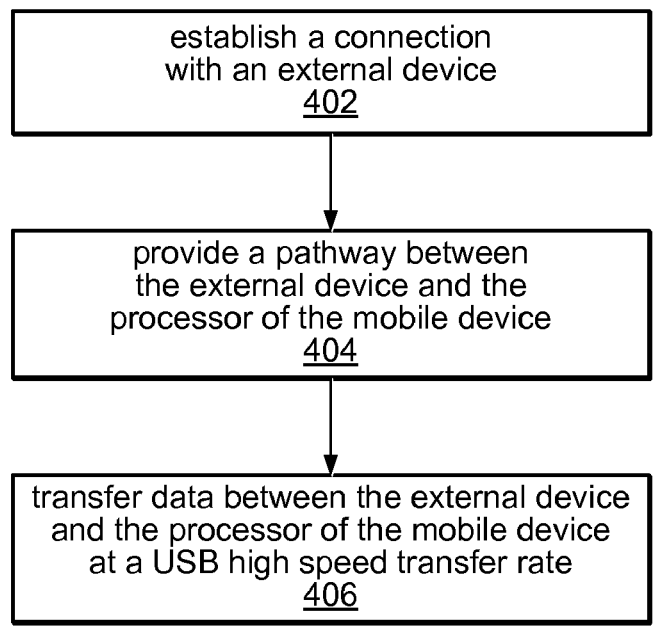

FIG. 4 illustrates a method for providing a high speed connection to a memory medium of a mobile device. The method shown in FIG. 4 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

In 402, a connection may be established a mobile device and an external device. In one embodiment, the connection may be established with a processor of the mobile device and the external device. The external device may be connected to the mobile device via a first port of the mobile device. The connection may be established by logic of a device or chip within the mobile device, such as those described above in FIGS. 2A and 2B. For example, as indicated above, the hub logic of the chip may establish the connection with the mobile device. In various embodiments, the connection may be established according to various protocols. For example, in one embodiment, the connection may be established according to USB protocols, e.g., using an enumeration process. However, note that various on the go (OTG) protocols (e.g., as defined in the USB specification) may be used, as desired.

As indicated above, the external device may be any of a variety of devices (e.g., computers or other devices) and the mobile device may be any of a variety of portable devices (e.g., cell phones, portable media players, PDAs, etc.). Thus, a connection may be established between the mobile device and the external device.

In 404, a pathway may be provided between the processor of the mobile device and the external device may be provided. The provided pathway may include the USB hub of the mobile device, and an interface to the processor (e.g., a ULPI, possibly using a first set of standard registers). Exemplary pathways are illustrated in FIGS. 2A and 2B above. However, note that the method is not limited to those pathways described herein or the block diagrams provided by FIGS. 2A and 2B.

In 406, data may be transferred between the external device and the processor of the mobile device, e.g., at a USB high speed transfer rate, using the provided pathway. The USB high transfer rate may be a USB 2.0 high transfer rate (e.g., 480 Mbps), or greater transfer rates, for example. However, USB high transfer rate may refer to speeds greater than the transfer rates offered by USB 1.1. Note that this transfer of data may not affect the local bus of the device since the processor communicates over a dedicated interface (e.g., the ULPI) and pathway, which does not include the local bus.

During transfer of data, the processor may act as an intermediate device (or go between) between the external device and memory mediums of the mobile device (e.g., SIM cards, SD cards, flash memory, and/or other memory). For example, the transfer of data between the external device and the processor may involve updating the firmware of the mobile device and/or updating stored files, contacts, and/or other information of the mobile device, as desired. Note that during transfer of data to the processor, the processor may be limited (e.g., a significant portion of the processing capability of the processor may be used), and correspondingly, other activities of the processor may be limited. For example, where the mobile device is a cell phone, the processor may not be able to perform calls and/or other activities while performing this data transfer (unlike embodiments described above regarding FIG. 3.

In some embodiments, as noted above, the method may further include transferring data between the processor and a memory medium of the mobile device, e.g., using a second set of registers (e.g., the extended ULPI registers). Similar to above, this transfer between the processor and the memory medium may not interfere with data transfer occurring over the local bus of the mobile device since the pathway does not include the local bus.

FURTHER EMBODIMENTS

Note that the methods of FIGS. 3 and 4 may be used in conjunction. For example, the USB hub in the mobile device may allow for the memory medium of the mobile device and the processor (likely represented as the mobile device itself) to be recognized as two separate devices (e.g., a removable storage device, and the mobile device, possibly as USB devices). In some embodiments, the external device may be operable to simultaneously exchange data with both the memory medium of the mobile device and the mobile device itself (e.g., for firmware updates, accessing other memory mediums of the mobile device, etc.). Note that where USB is used, "simultaneous" may mean that the transfer of data is serialized and multiplexed (muxed) for both connection pathways; thus data may be sent through USB at the same time in a multiplexed fashion. In other words, as the USB is a serial bus, data for only one transfer is present on the bus at any one time, but the data from two different sources (or to two different targets) is interleaved on the USB in a multiplexed fashion, and thus the transfers are said to be "simultaneous".

Thus, the USB hub of the mobile device (e.g., of the chip in the mobile device) may allow for high speed connections between an external device and a memory medium of the mobile device and the external device and the processor of the mobile device (e.g., simultaneously). Note that the USB hub may allow multiple connections from multiple external devices as necessary. For example, in one embodiment, a first external device may be connected at high speed to the processor while a second external device may be connected at high speed to the memory medium. The USB hub may also allow for switching of the provided pathways between the first and second external devices. Note that this may apply to more than two external devices (or internal devices), as desired.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A system that is configured to be incorporated in a mobile device, comprising:
   a first port that is configured to couple to an external computing device, wherein the first port comprises a universal serial bus (USB) port;
   a second port that is configured to couple to a memory medium comprised in the mobile device;
   a third port that is configured to couple to a processor comprised in the mobile device;
   a USB hub coupled to the first port, the second port, and the third port, wherein the USB hub is configured to provide a connection between the first port and the second port during transfer of data between the external computing device and the memory medium, and wherein the processor of the mobile device is not required for transfer of data between the external computing device and the memory medium.

2. The system of claim 1, wherein the USB hub is configured to provide a high speed USB connection between the external computing device and the memory medium.

3. The system of claim 1, wherein the third port is configured to use a first set of registers of a UTMI (USB Transceiver Macrocell Interface) low pin interface (ULPI) to communicate with the external computing device, and wherein the third port is configured to use a second set of registers of the ULPI to communicate with the memory medium.

4. The system of claim 1, wherein the memory medium of the mobile device is a removable memory medium.

5. The system of claim 1, wherein the USB hub is configured to provide a high speed connection between the first port and the third port.

6. The system of claim 1, wherein the mobile device comprises a mobile phone.

7. A system configured to be incorporated in a mobile device, comprising:
   a first port configured to couple to an external computing device;
   a second port configured to couple to a memory medium of the mobile device;
   first logic coupled to the first port, wherein the first logic is configured to provide a universal serial bus (USB) connection between the first port and the second port during transfer of data between the external computing device and the memory medium; and
   a third port configured to couple to a processor of the mobile device, wherein the third port is configured to provide a USB high speed digital interface for the processor.

8. The system of claim 7, wherein the USB high speed digital interface for the processor comprises a UTMI (USB Transceiver Macrocell Interface) low pin interface (ULPI).

9. The system of claim 8, wherein the third port is configured to use a first set of registers of a ULPI to communicate with the external computing device, and wherein the third port is configured to use a second set of registers of the ULPI to communicate with the memory medium.

10. The system of claim 7, wherein the first logic comprises a USB hub, wherein the USB hub is coupled to the first, second and third ports.

11. The system of claim 7, wherein the memory medium is a removable memory medium.

12. The system of claim 7, wherein the mobile device comprises a mobile phone.

* * * * *